(12) United States Patent
DiGiovanni et al.

(10) Patent No.: US 10,279,454 B2
(45) Date of Patent: May 7, 2019

(54) POLYCRYSTALLINE COMPACTS INCLUDING DIAMOND NANOPARTICLES, CUTTING ELEMENTS AND EARTH-BORING TOOLS INCLUDING SUCH COMPACTS, AND METHODS OF FORMING SAME

(71) Applicants: Baker Hughes Incorporated, Houston, TX (US); Element Six Limited, Co. Clare (IE)

(72) Inventors: Anthony A. DiGiovanni, Houston, TX (US); Roger William Nigel Nilen, Edenvale (ZA)

(73) Assignees: Baker Hughes Incorporated, Houston, TX (US); Element Six Limited, Co. Clare (IE)

( * ) Notice: Subject to any disclaimer, the term of this patent is extended or adjusted under 35 U.S.C. 154(b) by 577 days.

(21) Appl. No.: 13/839,589

(22) Filed: Mar. 15, 2013

(65) Prior Publication Data
US 2014/0262539 A1    Sep. 18, 2014

(51) Int. Cl.
*B22F 1/00* (2006.01)
*B22F 3/14* (2006.01)
(Continued)

(52) U.S. Cl.
CPC ........ *B24D 18/0009* (2013.01); *B22F 1/0018* (2013.01); *B22F 3/14* (2013.01);
(Continued)

(58) Field of Classification Search
None
See application file for complete search history.

(56) References Cited

U.S. PATENT DOCUMENTS

| 3,745,623 A | 7/1973 | Rocco et al. |
| 4,224,380 A | 9/1980 | Bovenkerk et al. |

(Continued)

FOREIGN PATENT DOCUMENTS

| EP | 1116858 A1 | 2/2005 |
| WO | 2009128034 A1 | 10/2009 |
| WO | 2014134456 A1 | 9/2014 |

OTHER PUBLICATIONS

International Search Report for International Application No. PCT/US2014/028297 dated Jul. 10, 2014, 3 pages.
(Continued)

*Primary Examiner* — Kaj K Olsen
*Assistant Examiner* — Ross J Christie
(74) *Attorney, Agent, or Firm* — TraskBritt

(57) ABSTRACT

A polycrystalline compact includes a plurality of diamond grains of micron size, submicron size, or both, and a plurality of diamond nanoparticles disposed in interstitial spaces between the plurality of diamond grains. A method of forming a polycrystalline compact includes combining a plurality of micron and/or submicron-sized diamond grains and a plurality of diamond nanoparticles to form a mixture and sintering the mixture in a presence of a carburized binder to form a polycrystalline hard material having a plurality of inter-bonded diamond grains and diamond nanoparticles. Cutting elements including a polycrystalline compact and earth-boring tools bearing such compacts are also disclosed.

12 Claims, 5 Drawing Sheets

(51) Int. Cl.
- *B22F 5/00* (2006.01)
- *B24D 18/00* (2006.01)
- *B24D 99/00* (2010.01)
- *C04B 35/63* (2006.01)
- *C22C 26/00* (2006.01)
- *C04B 35/528* (2006.01)
- *C04B 35/532* (2006.01)
- *C04B 35/645* (2006.01)
- *E21B 10/573* (2006.01)

(52) U.S. Cl.
CPC .......... *B24D 99/005* (2013.01); *C04B 35/528* (2013.01); *C04B 35/532* (2013.01); *C04B 35/6303* (2013.01); *C04B 35/645* (2013.01); *C22C 26/00* (2013.01); *E21B 10/573* (2013.01); *B22F 2005/001* (2013.01); *C04B 2235/427* (2013.01); *C04B 2235/5436* (2013.01); *C04B 2235/5454* (2013.01)

(56) References Cited

U.S. PATENT DOCUMENTS

| | | | | |
|---|---|---|---|---|
| 5,045,092 | A * | 9/1991 | Keshavan | B23P 5/00 51/307 |
| 5,127,923 | A | 7/1992 | Bunting et al. | |
| 5,158,148 | A * | 10/1992 | Keshavan | B23P 5/00 175/426 |
| 5,304,342 | A * | 4/1994 | Hall, Jr. | B01J 3/062 51/293 |
| 5,674,620 | A | 10/1997 | Puiia et al. | |
| 6,287,360 | B1 | 9/2001 | Kembaiyan et al. | |
| 7,972,397 | B2 | 7/2011 | Vail | |
| 8,080,071 | B1 | 12/2011 | Vail | |
| 8,191,658 | B2 | 6/2012 | Schmitz et al. | |
| 2005/0019114 | A1 | 1/2005 | Sung | |
| 2006/0251567 | A1 * | 11/2006 | Sung | B01J 3/062 423/446 |
| 2008/0206576 | A1 * | 8/2008 | Qian | B24D 3/10 51/307 |
| 2010/0083583 | A1 | 4/2010 | Sumiya et al. | |
| 2010/0104874 | A1 * | 4/2010 | Yong | C22C 26/00 428/408 |
| 2010/0126779 | A1 * | 5/2010 | Corbett | B22F 7/06 175/432 |
| 2010/0300764 | A1 | 12/2010 | Naidoo et al. | |
| 2011/0020163 | A1 | 1/2011 | Nilen | |
| 2011/0031034 | A1 | 2/2011 | DiGiovanni et al. | |
| 2011/0061942 | A1 | 3/2011 | DiGiovanni | |
| 2011/0088954 | A1 | 4/2011 | DiGiovanni et al. | |
| 2011/0226532 | A1 | 9/2011 | Jonker et al. | |
| 2011/0252712 | A1 | 10/2011 | Chakraborty et al. | |
| 2011/0253459 | A1 * | 10/2011 | Davies | B22F 7/062 51/307 |
| 2012/0037429 | A1 * | 2/2012 | Davies | B22F 1/025 51/307 |
| 2012/0181090 | A1 | 7/2012 | Qian et al. | |
| 2012/0211284 | A1 | 8/2012 | DiGiovanni | |
| 2013/0000209 | A1 | 1/2013 | Chakraborty et al. | |
| 2013/0048389 | A1 * | 2/2013 | Bao | B24D 18/0009 51/307 |
| 2014/0374171 | A1 * | 12/2014 | Thomas | C22C 1/1036 175/425 |

OTHER PUBLICATIONS

International Written Opinion for International Application No. PCT/US2014/028297 dated Jul. 10, 2014, 5 pages.
International Preliminary Report on Patentability for International Application No. PCT/US2014/028297 dated Sep. 15, 2015.
European Search Report for European Application No. 14763739 dated Sep. 21, 2016, 9 pages.
Chinese Office Action for Chinese Application No. 201480016307.9 dated Oct. 8, 2016, 17 pages.
Chinese Second Office Action for Chinese Application No. 201480016307.9 dated Jun. 7, 2017, 6 pages.

* cited by examiner

POLYCRYSTALLINE COMPACTS INCLUDING DIAMOND NANOPARTICLES, CUTTING ELEMENTS AND EARTH-BORING TOOLS INCLUDING SUCH COMPACTS, AND METHODS OF FORMING SAME

FIELD

The present disclosure relates generally to polycrystalline diamond compacts, which may be used, for example, as cutting elements for earth-boring tools, and more particularly to polycrystalline diamond compacts including diamond nanoparticles, to methods of forming such compacts, and to cutting elements and earth-boring tools comprising such compacts.

BACKGROUND

Earth-boring tools for forming wellbores in subterranean earth formations generally include a plurality of cutting elements secured to a body. For example, fixed-cutter earth-boring rotary drill bits (also referred to as "drag bits") include a plurality of cutting elements fixedly attached to a bit body of the drill bit. Roller cone earth-boring rotary drill bits may include cones mounted on bearing pins extending from legs of a bit body such that each cone is capable of rotating about the bearing pin on which it is mounted. A plurality of cutting elements may be mounted to each cone of the drill bit. In other words, earth-boring tools typically include a bit body to which cutting elements are attached.

The cutting elements used in such earth-boring tools often include polycrystalline diamond compacts (often referred to as "PDCs"), which act as cutting faces of a polycrystalline diamond material. Polycrystalline diamond material is material that includes inter-bonded particles in the form of grains or crystals of diamond material. In other words, polycrystalline diamond material includes direct, inter-granular bonds between the grains or crystals of diamond material. The terms "grain," "crystal," and "particle" are used synonymously and interchangeably herein.

PDC cutting elements are conventionally formed by sintering and bonding together relatively small diamond grains under conditions of high temperature and high pressure in the presence of a catalyst (e.g., cobalt, iron, nickel, or alloys and mixtures thereof) to form a layer (referred to as a "compact" or "table") of polycrystalline diamond (PCD) material on a cutting element substrate. These processes are often referred to as high-temperature/high-pressure (HTHP) processes. The cutting element substrate may comprise a cermet material (i.e., a ceramic-metal composite material) such as, for example, cobalt-cemented tungsten carbide. In such instances, the cobalt (or other catalyst material) in the cutting element substrate may liquefy and diffuse into the diamond grains during sintering and serve as a catalyst (which may also be characterized as a binder) for forming the inter-granular diamond-to-diamond bonds, and the resulting diamond table, from the diamond grains. In other methods, powdered catalyst material may be mixed with the diamond grains prior to sintering the grains together in an HTHP process.

Upon formation of a diamond table using an HTHP process, catalyst material may remain in interstitial spaces between the grains of diamond in the resulting PDC. The presence of the catalyst material in the diamond table may contribute to thermal damage in the diamond table when the cutting element is heated during use, due to friction at the contact point between the cutting element and the formation.

Polycrystalline diamond (PCD) typically contains more than 80 volume percent sintered diamond grains, with the balance a binder phase. As noted above, this binder phase is conventionally provided via infiltration from a supporting cemented carbide substrate, but may also be incorporated into the starting diamond powder as an admixture. The diamond grains typically lie within the 1 to 50 micron size range, but there is significant interest in incorporating a nanodiamond grain component, which may comprise a substantial portion, for increased PCD abrasion resistance, fracture toughness, and thermal stability. Such enhanced performance is believed to be attributable to increased diamond percent volume, augmented diamond particle inter-bonding, and reduction in catalyst material volume in the PCD.

However, significant problems have been encountered when diamond nanoparticles are incorporated in PCD. The diamond nanoparticles may dissolve in the liquid state, infiltrating binder from the substrate or admixed binder under HTHP process conditions, resulting in the loss of the beneficial characteristics of abrasion resistance, fracture toughness, and thermal stability provided by the presence of the diamond nanoparticles. Further, when a conventional cobalt-cemented tungsten carbide substrate is employed, sintering quality may be compromised due to the loss of binder volume available to the sintering process. This phenomenon becomes more evident when relatively higher concentrations of diamond nanoparticles, for example greater than about ten percent by volume, are employed to form PCD. In addition, the presence of tightly packed diamond nanoparticles in a volume of diamond grains undergoing HTHP processing inhibits infiltration of liquid-state binder from the substrate through the diamond table, causing a less well sintered region in the diamond table as distance increases from the interface between the diamond table and the substrate, resulting in poor abrasion resistance and compromised mechanical integrity of the diamond table.

The use of diamond-enhanced carbide (DEC) substrates has demonstrated improvements in creating more durable and impact resistant PDC cutting elements, as described in U.S. Patent Application Publication No. US 2011/0226532 A1, published Sep. 22, 2011, and titled "Insert for an Attack Tool, Method for Making Same and Tools Incorporating Same," the disclosure of which is incorporated herein in its entirety by reference. Methods of forming DEC substrates are described in International Patent Publication WO 2009/128034 A1, published Oct. 22, 2009, and titled "Super-Hard Enhanced Hard-Metals," the disclosure of which is incorporated herein in its entirety by reference.

The improvement in PDC cutting element durability and impact-resistance, as described in U.S. Patent Application Publication No. US 2011/0226532 A1, is due to the increase in Young's modulus of a "bolster" portion of the cutting element substrate comprising DEC due to the presence of diamond grains dispersed in a cobalt or other metal-cemented carbide substrate, as well as to size of the diamond grains employed. The substrate structure provides enhanced stiffness of support of the PCD table of the cutting element superior to that provided by a conventional, cobalt-cemented carbide substrate. However, an undesirable result of sintering a PCD table comprising micron-sized diamond grains using a DEC substrate is excessively high cobalt binder content in the as-formed PCD table and, consequently, a lower wear resistance may result.

BRIEF SUMMARY

In some embodiments, a method of fabricating polycrystalline diamond includes encapsulating micron-sized diamond grains and diamond nanoparticles in a canister, and subjecting the encapsulated diamond particles and diamond nanoparticles in the presence of a carburized binder to a pressure of at least 5.0 GPa and a temperature of at least 1000° C. to form inter-granular bonds between the diamond particles.

A polycrystalline compact includes a plurality of grains of diamond material and a plurality of diamond nanoparticles disposed in interstitial spaces between, and bonded to, the plurality of grains of diamond material. The plurality of diamond nanoparticles are bonded to the grains of diamond material by subjecting the diamond nanoparticles and the grains of diamond material in the presence of a carburized binder to a pressure of at least 5.0 GPa and a temperature of at least 1000° C.

An earth-boring tool includes a bit body and a polycrystalline diamond compact secured to the bit body. The polycrystalline compact comprises a plurality of grains of diamond material and a plurality of diamond nanoparticles disposed in interstitial spaces between and bonded to, the grains of diamond material. The plurality of diamond nanoparticles are bonded to the grains of diamond material by subjecting the diamond nanoparticles and the grains of diamond material in the presence of a carburized binder to a pressure of at least 5.0 GPa and a temperature of at least 1000° C.

BRIEF DESCRIPTION OF THE DRAWINGS

While the specification concludes with claims particularly pointing out and distinctly claiming what are regarded as embodiments of the disclosure, various features and advantages of embodiments of the disclosure may be more readily ascertained from the following description of some embodiments of the disclosure when read in conjunction with the accompanying drawings, in which:

DETAILED DESCRIPTION

Figure 1A:
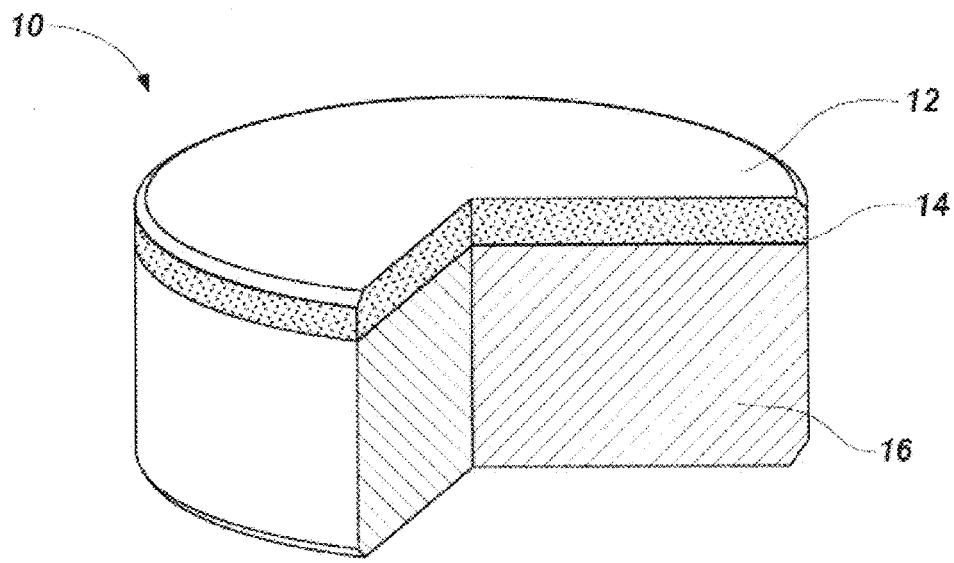
FIG. 1A is a partial cut-away perspective view illustrating an embodiment of a cutting element comprising a polycrystalline compact of the present disclosure.

The illustrations presented herein are not actual views of any particular polycrystalline compact, microstructure of a polycrystalline compact, particle, cutting element, or earth-boring tool, and are not drawn to scale, but are merely idealized representations employed to describe the present disclosure. Additionally, elements common between figures may retain the same numerical designation.

As used herein, the term "earth-boring tool" means and includes any type of bit or tool used for drilling during the formation or enlargement of a wellbore and includes, for example, rotary drill bits, percussion bits, core bits, eccentric bits, bi-center bits, reamers, mills, drag bits, roller-cone bits, hybrid bits, and other drilling bits and tools known in the art.

As used herein, the term "particle" means and includes any coherent volume of solid matter having an average dimension of about 2 mm or less. Grains (i.e., crystals) and coated grains are types of particles. As used herein, the term "nanoparticle" means and includes any particle having an average particle diameter of about 500 nm or less. Nanoparticles include grains in a polycrystalline hard material having an average grain size of about 500 nm or less.

As used herein, the term "nanodiamond" means and includes any single or polycrystalline or agglomeration of nanocrystalline carbon material comprising a mixture of sp-3 and sp-2 bonded carbon wherein the individual particle or crystal whether singular or part of an agglomerate is primarily made up of sp-3 bonds. Commercially nanodiamonds are derived from detonation sources (UDD) and crushed sources and can be naturally occurring or manufactured synthetically wherein naturally occurring nanodiamond include the natural lonsdaleite phase identified with meteoric deposits.

As used herein, the term "polycrystalline hard material" means and includes any material comprising a plurality of grains or crystals of the material that are bonded directly together by inter-granular bonds. The crystal structures of the individual grains of polycrystalline hard material may be randomly oriented in space within the polycrystalline hard material.

As used herein, the term "polycrystalline compact" means and includes any structure comprising a polycrystalline hard material comprising inter-granular bonds formed by a process that involves application of pressure (e.g., compaction) to the precursor material or materials used to form the polycrystalline hard material.

As used herein, the term "inter-granular bond" means and includes any direct atomic bond (e.g., covalent, metallic, etc.) between atoms in adjacent grains of material.

As used herein, the terms "catalyst material" and "binder material" each mean and include any material that is capable of catalyzing the formation of inter-granular bonds between grains of hard material during a sintering process (e.g., an HTHP process). For example, catalyst materials for diamond include cobalt, iron, nickel, other elements from Group VIII-A of the periodic table of the elements, and alloys thereof including without limitations Co—Ni, Co—Fe, Ni—Fe, INCONEL® and HASTALLOY® alloys.

As used herein, the term "hard material" means and includes any material having a Knoop hardness value of about 3,000 $Kg_f/mm^2$ (29,420 MPa) or more. Hard materials include, for example, diamond and cubic boron nitride.

As used herein, the term "carburized" means and includes having an increased concentration of carbon. For example, a metal (e.g., cobalt) binder may be carburized if it includes a higher concentration of carbon than is typical for hard-metal substrates, such as beyond the carbon-saturation limit for the metal at room temperature and pressure conditions.

FIG. 1A is a simplified, partially cut-away perspective view of an embodiment of a cutting element 10 of the present disclosure. The cutting element 10 includes a polycrystalline compact in the form of a layer of hard polycrystalline hard material 12, also known in the art as a polycrystalline table, that is provided on (e.g., formed on or attached to) a supporting substrate 16 with an interface 14 therebetween. Though the cutting element 10 in the embodiment depicted in FIG. 1A is cylindrical or disc-shaped, in other embodiments, the cutting element 10 may have any desirable shape, such as a dome, cone, chisel, etc.

In some embodiments, the polycrystalline hard material 12 comprises polycrystalline diamond. In such embodiments, the cutting element 10 may be referred to as a PDC cutting element.

In some embodiments, the substrate 16 comprises a DEC substrate such as a diamond enhanced tungsten carbide substrate, while in other embodiments, substrate 16 may comprise a conventional, cobalt-cemented carbide substrate such as a cobalt-cemented tungsten carbide substrate with a carburized binder.

Figure 1B:
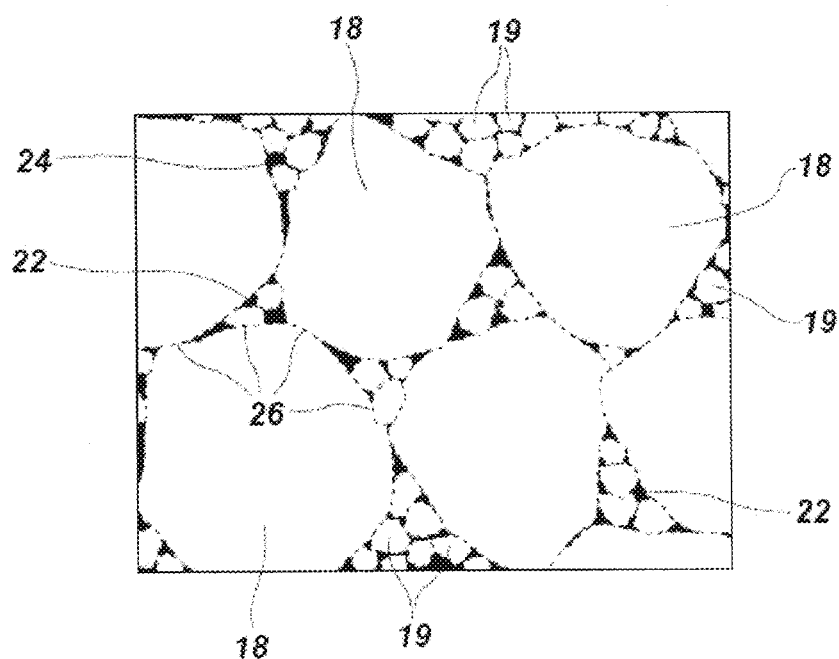
FIG. 1B is a simplified drawing showing how a microstructure of the polycrystalline compact of FIG. 1A may appear under magnification, and illustrates inter-bonded and interspersed larger and smaller grains of hard material.

FIG. 1B is an enlarged simplified view illustrating how a microstructure of the polycrystalline hard material 12 (FIG. 1A) of the cutting element 10 may appear under magnification. As discussed in further detail below, the polycrystalline hard material 12 may include inter-bonded micron-sized grains 18 of diamond material. The polycrystalline hard material 12 also includes other, smaller diamond particles 19 (e.g., diamond nanoparticles (nanodiamond)) disposed in interstitial spaces 22 between the micron-sized inter-bonded grains 18 of diamond material and inter-bonded therewith as indicated at 26. In some embodiments, and as shown in FIG. 1B, the grains 18 of diamond material in the polycrystalline hard material 12 may have a substantially uniform, mono-modal grain size distribution, and the diamond nanoparticles may likewise be of substantially uniform size. In some embodiments, a catalyst material 24 may reside in regions of interstitial spaces 22 unoccupied by diamond nanoparticles 19.

In additional embodiments, one or both of the grains 18 and diamond nanoparticles 19 of the polycrystalline hard material 12 may have a multi-modal (e.g., bi-modal, tri-modal, etc.) grain size distribution. For example, the polycrystalline hard material 12 may comprise a multi-modal grain size distribution as disclosed in at least one of U.S. Patent Application Publication No. US 2011/0031034 A1, published Feb. 10, 2011, and titled "Polycrystalline Compacts Including In-Situ Nucleated Grains, Earth-Boring Tools Including Such Compacts, and Methods of Forming Such Compacts and Tools;" U.S. Patent Application Publication No. US 2011/0061942 A1, published Mar. 17, 2011, and titled "Polycrystalline Compacts Having Material Disposed in Interstitial Spaces Therein, Cutting Elements and Earth-Boring Tools Including Such Compacts, and Methods of Forming Such Compacts;" and U.S. Patent Application Publication No. US 2011/0088954 A1, published Apr. 21, 2011, and titled "Polycrystalline Compacts Including Nano-particulate Inclusions, Cutting Elements and Earth-Boring Tools Including Such Compacts, and Methods of Forming Such Compacts;" the disclosures of each of which are incorporated herein in their entireties by this reference.

More specifically, polycrystalline hard material 12 may include interspersed and inter-bonded diamond grains 18 and nanoparticles 19 that form a three-dimensional network of diamond material. The diamond grains 18 and/or the smaller diamond nanoparticles 19 may have average particle dimensions (e.g., mean diameters) of less than 1 mm, less than 0.1 mm, less than 0.01 mm, less than 1 μm, less than 0.1 μm, or even less than 0.01 μm. That is, the larger diamond grains 18 may include micron-sized diamond particles (diamond grains in a range from about 1 μm to about 500 μm (0.5 mm)) and submicron-sized diamond particles (diamond grains in a range from about 500 nm (0.5 μm) to about 1 μm). The diamond nanoparticles 19 may have an average particle diameter of about 500 nm or less. In some embodiments, the larger diamond grains 18 may be one or both of micron-sized diamond particles and submicron-sized particles, combined with diamond nanoparticles 19. Interstitial spaces are present between the inter-bonded diamond grains 18 and diamond nanoparticles 19 of the polycrystalline hard material 12. These interstitial spaces may be at least partially filled with a solid substance, such as a metal solvent catalyst material 24 (e.g., iron, cobalt, nickel, or an alloy or mixture thereof). In other embodiments, the interstitial spaces may include empty voids within the polycrystalline hard material 12 free of a solid or liquid substance (although a gas, such as air, may be present in the voids). Such empty voids may be formed by removing (e.g., leaching) solid material out from the interstitial spaces after forming the polycrystalline hard material 12. In yet further embodiments, the interstitial spaces may be at least partially filled with a solid substance in one or more regions of the polycrystalline hard material, while the interstitial spaces in one or more regions of the polycrystalline hard material 12 include empty voids.

As known in the art, the average grain size of grains within a microstructure may be determined by measuring grains of the microstructure under magnification. For example, a scanning electron microscope (SEM), a field emission scanning electron microscope (FESEM), or a transmission electron microscope (TEM) may be used to view or image a surface of a polycrystalline hard material 12 (e.g., a polished and etched surface of the polycrystalline hard material 12). Commercially available vision systems are often used with such microscopy systems, and these vision systems are capable of measuring the average grain size of grains within a microstructure.

In some embodiments, at least some of the grains 18 of diamond material may include in-situ nucleated grains of diamond material, as disclosed in U.S. Patent Application Publication No. US 2011/0031034 A1, previously incorporated by reference.

Referring again to FIGS. 1A and 1B, the volume occupied by the diamond nanoparticles 19 in the polycrystalline hard material 12 may be in a range extending from about 0.01% to about 50% of the volume of the polycrystalline hard material 12, such as from about 0.1% to about 10% of the volume of the polycrystalline hard material 12. The weight percentage of the diamond nanoparticles 19 in the polycrystalline hard material 12 may be in a range extending from about 0.1% to about 50% by weight, such as from about 0.1% to about 10% by weight.

In embodiments in which the polycrystalline hard material 12 includes polycrystalline diamond, the catalyst material 24 may be a Group VIII-A element (e.g., iron, cobalt, nickel, etc.) or an alloy thereof, and the catalyst material 24 may be between about one tenth of one percent (0.1%) and about ten percent (10%) by volume of the polycrystalline hard material 12.

The layer of polycrystalline hard material 12 of the cutting element 10 may be formed using HTHP processes. Such processes, and systems for carrying out such processes, are generally known in the art and not described in detail herein. In some embodiments, the polycrystalline hard material 12 may be formed on a supporting substrate 16 (as shown in FIG. 1A) of cemented tungsten carbide or another suitable substrate material in a conventional HTHP process of the type described, by way of non-limiting example, in U.S. Pat. No. 3,745,623, issued Jul. 17, 1973, and titled "Diamond Tools for Machining," or may be formed as a freestanding polycrystalline hard material 12 (i.e., without the supporting substrate 16) in a similar conventional HTHP process as described, by way of non-limiting example, in U.S. Pat. No. 5,127,923, issued Jul. 7, 1992, and titled "Composite Abrasive Compact Having High Thermal Stability," the disclosures of each of which are incorporated herein in their entireties by this reference. In some embodiments, the catalyst material 24 may be supplied from the supporting substrate 16 during an HTHP process used to form the polycrystalline hard material 12. For example, the substrate 16 may comprise a diamond enhanced cobalt-cemented tungsten carbide material as described in U.S. Patent Application Publication No. US 2011/0226532 A1 and International Patent Publication WO 2009/128034 A1. The cobalt of the cobalt-cemented tungsten carbide may serve as the catalyst material 24 during the HTHP process.

To form the polycrystalline hard material 12 (FIG. 1A) in an HTHP process, a particulate mixture including particles (e.g., grains) of micron-sized diamond grains 18 and diamond nanoparticles 19 (FIG. 1B) may be subjected to elevated temperatures (e.g., temperatures greater than about 1,000° C.) and elevated pressures (e.g., pressures greater than about 5.0 gigapascals (GPa)). These conditions may promote the formation of inter-granular bonds 26 between the particles of micron-sized diamond material and the diamond nanoparticles 19. In some embodiments, the particulate mixture may be subjected to a pressure greater than about 6.0 GPa, greater than about 8.0 GPa, or even greater than about 9.0 GPa. The particulate mixture may be subjected to a temperature from about 1,200° C. to about 1,700° C., such as a temperature greater than about 1,500° C., in the HTHP process.

In some embodiments, the particulate mixture may include a powder or a powder-like substance. In other embodiments, however, the particulate mixture may be carried by (e.g., on or in) another material, such as a tape or film, which, after stacking to a selected thickness, may be subjected to an HTHP process. An organic material also may be included with the particulate mixture to facilitate processing. For example, some suitable materials are described in U.S. Patent Application Publication No. US 2012/0211284 A1, published Aug. 23, 2012, and titled "Methods of Forming Polycrystalline Compacts, Cutting Elements and Earth-Boring Tools," the disclosure of which is incorporated herein in its entirety by this reference.

Figure 2:
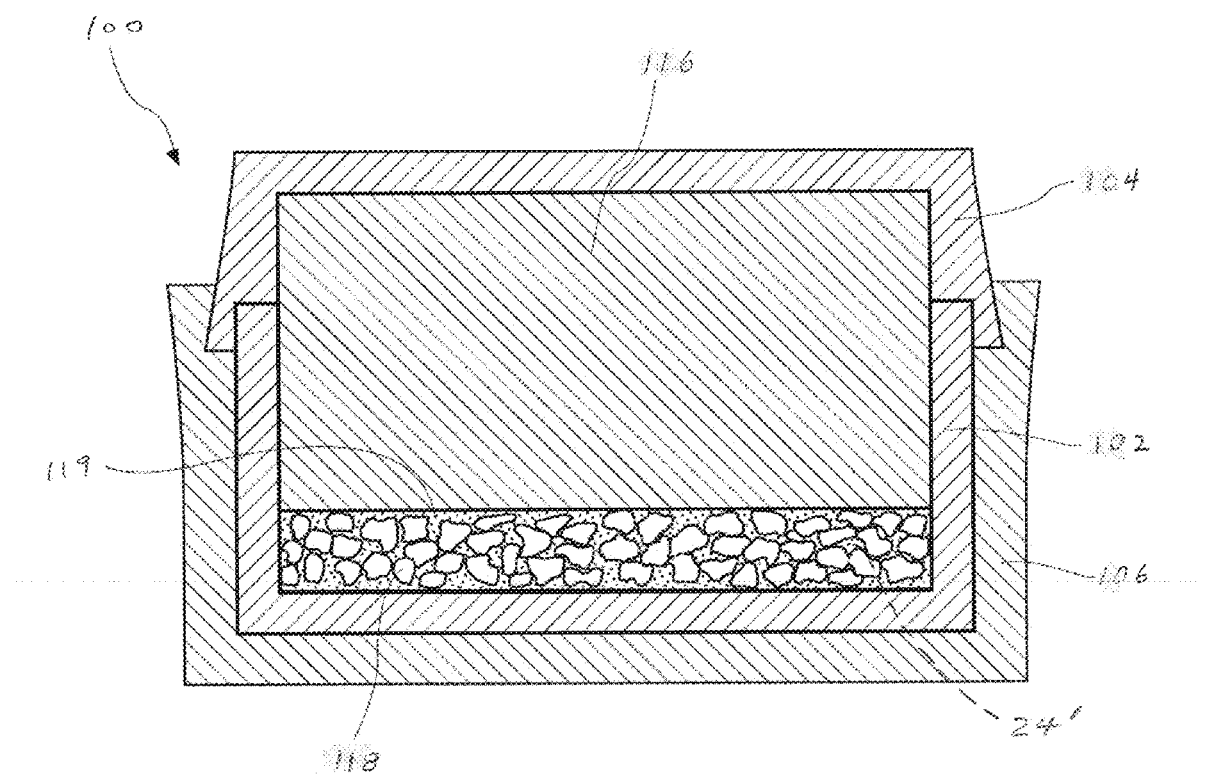
FIG. 2 is a simplified cross-sectional view illustrating a mixture of diamond grains and diamond nanoparticles encapsulated within a container in preparation for subjecting the container and the mixture therein to an HTHP sintering process to form a polycrystalline diamond compact cutting element.

As depicted in FIG. 2, diamond grains 118 may be positioned within a canister 100 (e.g., a metal canister) prior to undergoing the HTHP process used to form polycrystalline hard material 12. The diamond grains 118 may include grains or crystals of micron- and/or submicron-sized diamond (e.g., diamond grit), which will ultimately form the diamond grains 18 in the sintered polycrystalline hard material 12 (see FIGS. 1A and 1B). Diamond nanoparticles 119 also may be present in the spaces between the diamond grains 118 in the canister 100. As shown in FIG. 2, the canister 100 may include an inner cup 102 in which the diamond grains and the diamond nanoparticles 119 may be provided. If the cutting element 10 is to include a substrate 16, a substrate blank 116 may, optionally also be provided in the inner cup 102 over or under the diamond grains 118 and the diamond nanoparticles 119, and may ultimately be encapsulated in the canister 100. The canister 100 may include a top end piece 104 and a bottom end piece 106, which may be assembled and bonded together (e.g., swage bonded) around the inner cup 102 with the diamond grains 118, the diamond nanoparticles 119, and the optional substrate blank 116 therein. In some embodiments, substrate blank 116 may include a DEC substrate blank. In other embodiments, substrate blank 116 may include a conventional, cobalt-cemented substrate blank. In the latter case, a carburized binder 24' (indicated by a broken line) may be admixed with the diamond grains 118 and diamond nanoparticles 119. In some embodiments, the substrate blank 116 may include conventional substrate blank with a DEC or other carburized material thereon. For example, the DEC or carburized material may form a thin layer (e.g., a layer 2-3 mm thick) over the substrate blank 116, and adjacent the diamond grains 118 and diamond nanoparticles 119.

In the canister 100, the diamond grains 118 may have a packing fraction from about 80% to about 99% (i.e., with a void space of between about 20% and about 1% of the total volume), such as from about 85% to about 95% (i.e., with a void space of between about 5% and about 15% of the total volume). The diamond nanoparticles 119 may occupy void space between the diamond grains 118, such that the diamond nanoparticles are in proximity to the diamond grains 118. For example, in some embodiments the diamond nanoparticles may substantially fill the void space between the diamond grains 118. In other embodiments, a carburized binder 24' may partially fill the void space between the diamond grains 118. A conventional HTHP process for forming the polycrystalline hard material 12 and the cutting element 10 is then performed.

Optionally, the catalyst material 24 (e.g., a portion of the carburized binder 24') may be removed from the as-formed polycrystalline hard material 12 after the HTHP process using processes known in the art. For example, a leaching process may be used to remove the catalyst material 24 from the interstitial spaces 22 between the grains 18 of diamond material and diamond nanoparticles 19 in at least a portion of the polycrystalline hard material 12. By way of example and not limitation, a portion of the polycrystalline hard material 12 may be leached using a leaching agent and process such as those described more fully in, for example, U.S. Pat. No. 5,127,923, previously incorporated herein by reference, and U.S. Pat. No. 4,224,380, issued Sep. 23, 1980, and titled "Temperature Resistant Abrasive Compact and Method for Making Same,", the disclosure of which is incorporated herein in its entirety by this reference. Specifically, aqua regia (a mixture of concentrated nitric acid ($HNO_3$) and concentrated hydrochloric acid (HCl)) may be used to at least substantially remove catalyst material 24 from the interstitial spaces 22. It is also known to use boiling hydrochloric acid (HCl) and boiling hydrofluoric acid (HF) as leaching agents. One particularly suitable leaching agent is hydrochloric acid (HCl) at a temperature of above about 110° C., which may be provided in contact with the polycrystalline hard material 12 for a period of about two (2) hours to about sixty (60) hours, depending upon the size of the body of polycrystalline hard material 12. After leaching the polycrystalline hard material 12, the interstitial spaces 22 between the inter-bonded grains 18 of hard material within the polycrystalline hard material 12 subjected to the leaching process may be at least substantially free of catalyst material 24 used to catalyze formation of inter-granular bonds 26 between the grains in the polycrystalline hard material 12. The leaching process may be applied to only a portion of the polycrystalline hard material 12, or to the entire body of the polycrystalline hard material 12.

Figure 3:
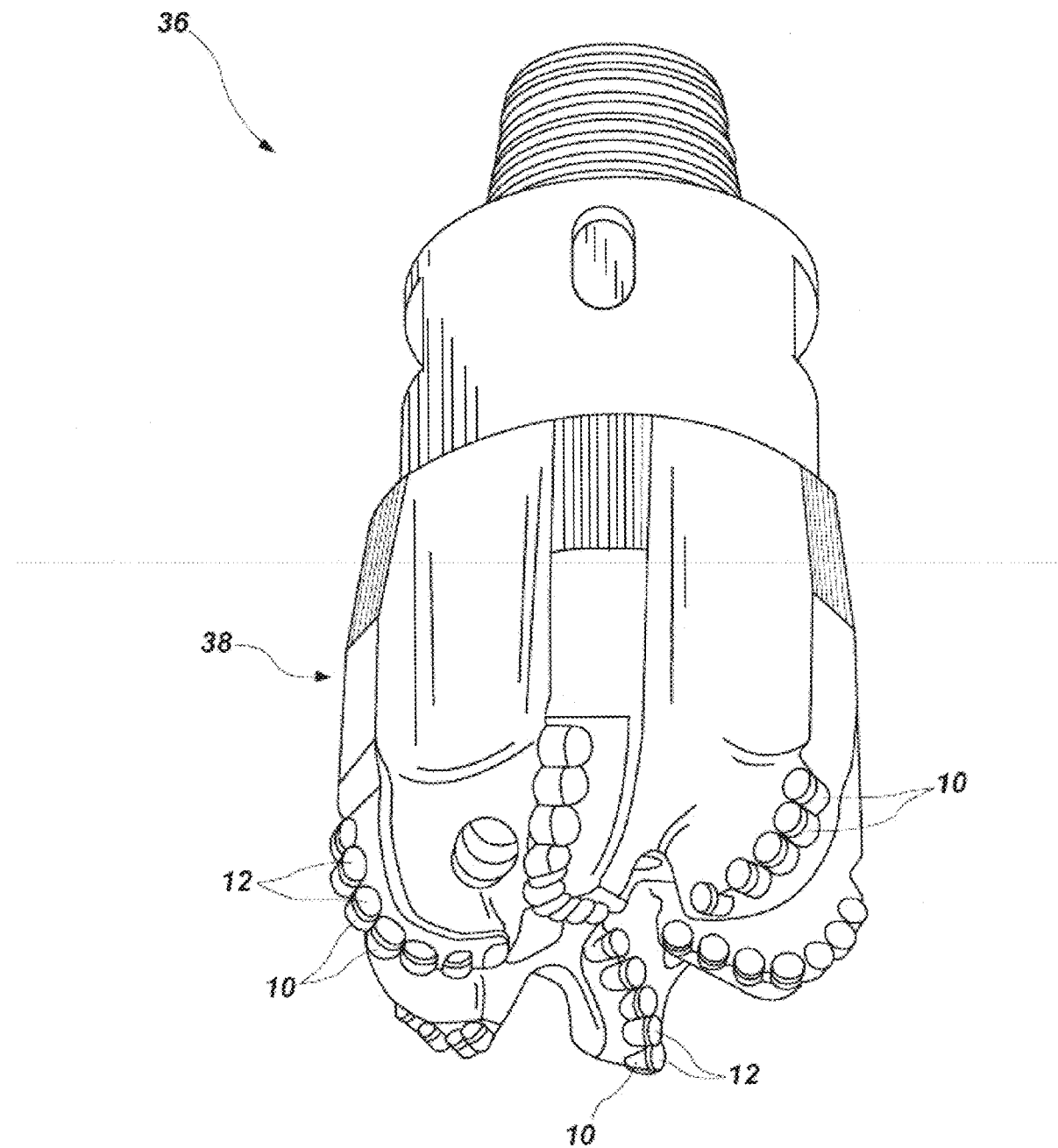
FIG. 3 is a perspective view of an embodiment of a fixed-cutter earth-boring rotary drill bit that includes a plurality of polycrystalline compacts like that shown in FIGS. 1A and 1B.

Embodiments of cutting elements 10 of the present disclosure that include a polycrystalline compact comprising polycrystalline hard material 12 formed on a DEC substrate as previously described herein, such as the cutting element 10 illustrated in FIG. 1A, may be formed and secured to an earth-boring tool such as a rotary drill bit, a percussion bit, a coring bit, an eccentric bit, a reamer tool, a milling tool, etc., for use in forming wellbores in subterranean formations. As a non-limiting example, FIG. 3 illustrates a fixed cutter type earth-boring rotary drill bit 36 that includes a plurality of cutting elements 10, each of which includes a polycrystalline compact comprising polycrystalline hard material 12 on a DEC substrate as previously described herein. The earth-boring rotary drill bit 36 includes a bit body 38, and the cutting elements 10, which include polycrystalline hard material 12 (see FIG. 1A), are bonded to the bit body 38. The cutting elements 10 may be brazed (or otherwise secured) within pockets formed in the outer surface of the bit body 38.

The use of a carburized binder for improved sintering of diamond nanoparticle-containing PCD comprises saturating an infiltrating or admixed binder with carbon. This reduces the dissolution rate of diamond, including the diamond nanoparticles, in the binder, to increase the retention and survival rate of diamond nanoparticles. The carbon-saturation also decreases the viscosity of the infiltrating binder, as the excess carbon in the binder lowers the binder melting point, for more effective infiltration throughout the tightly packed micron-sized diamond grains and diamond nanoparticles of the PCD table.

The binder may be carburized to over-saturation, in which case the excess carbon may convert to diamond at HTHP conditions of PCD sintering. Conversion of carburized binder to diamond may result in a "diamond enhanced carbide" portion of the substrate if infiltrating from a carburized substrate as described in International Patent Publication WO 2009/128034 A1, or increased diamond content in the case of an admixed carburized binder. Both eventualities bring further benefits.

Polycrystalline hard materials that include diamond nanoparticles in interstitial spaces between the inter-bonded, larger grains of diamond material and bonded to the grains of diamond material, as described herein, may exhibit improved thermal stability and improved mechanical durability in terms of abrasion resistance and impact resistance, relative to previously known polycrystalline hard materials. By including diamond nanoparticles in the interstitial spaces between the inter-bonded grains of hard material, less catalyst material may be disposed in interstitial spaces between the grains in a resulting polycrystalline hard material, which may improve one or both of the thermal stability and the mechanical durability of the ultimate polycrystalline hard material.

EXAMPLES

Example 1: Sintering of Diamond with a WC/Co Substrate at 7.0 kW

Figure 4:
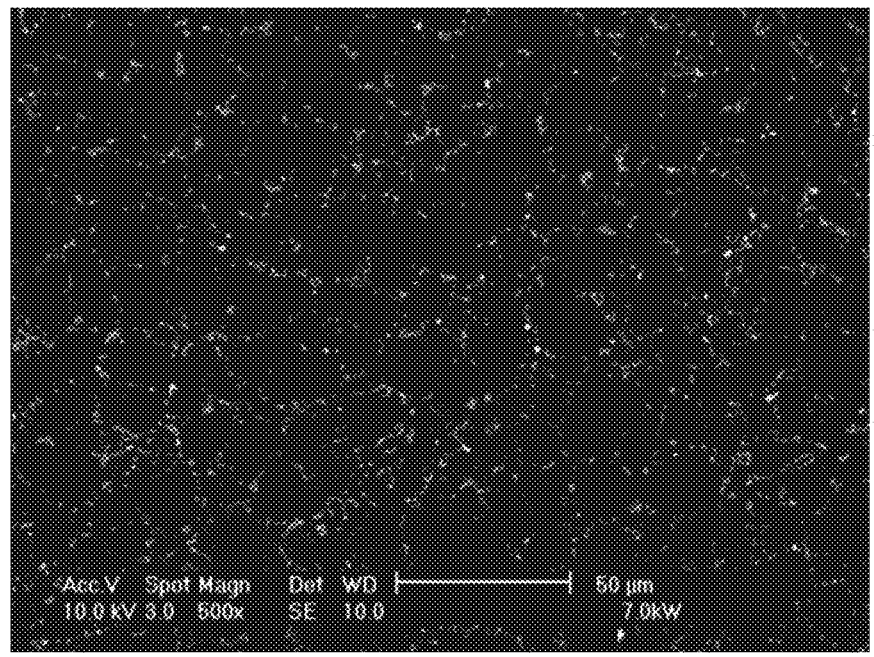
FIGS. 4 through 6 are SEM images of PDCs formed as described in Examples 1 through 3, respectively.

Diamond grains were disposed within a metal canister. A substrate blank comprising WC/Co (cobalt-cemented tungsten carbide) was placed in the metal canister over the diamond grains and the diamond nanoparticles. The substrate blank and the diamond grains were encapsulated in the canister, and were subjected to an HPHT process at a pressure of about 7.7 GPa and a temperature from about 1550° C. to about 1600° C. by applying 7.0 kW of electrical power. The HPHT process formed a PDC, which was photographed with an SEM (scanning electron microscope), as shown in FIG. 4. The diamond table is well sintered, and includes significant diamond intergrowth between diamond grains.

Example 2: Sintering of Diamond with a WC/Co Substrate at 6.5 kW

Figure 5:
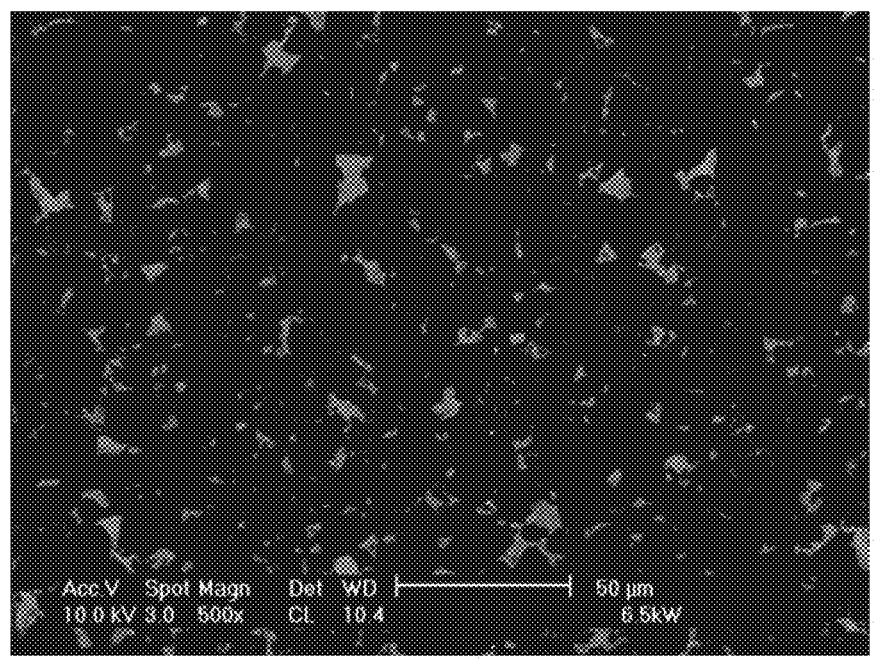

A PDC was formed as described in Comparative Example 1, but only 6.5 kW of power was applied, and the sintering temperature was therefore between about 1440° C. to about 1485° C. The resulting PDC was photographed with an SEM, as shown in FIG. 5. The diamond table is undersintered, and lacks significant diamond intergrowth.

Example 3: Sintering of Diamond with a DEC Substrate at 6.5 kW

Figure 6:
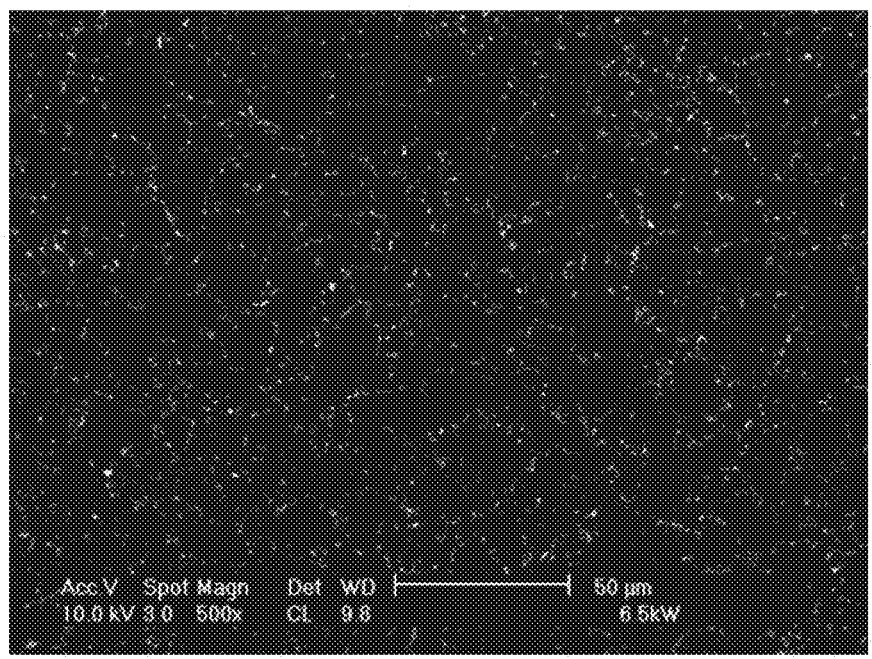

Diamond grains were disposed within a metal canister. A substrate blank comprising 90% by volume WC/Co and 10% by volume diamond was placed in the metal canister over the diamond grains and the diamond nanoparticles. The substrate blank and the diamond grains were encapsulated in the canister, and were subjected to an HPHT process at a pressure of about 7.7 GPa and a temperature from about 1440° C. to about 1485° C. by applying 6.5 kW of electrical power. The HPHT process formed a PDC, which was photographed with an SEM, as shown in FIG. 6. The diamond table is well sintered, and includes significant diamond intergrowth. Thus, the PDC may be formed with a substrate of WC/Co and diamond at a lower power level and lower temperature, yet may still attain significant diamond intergrowth.

Additional non-limiting example embodiments of the disclosure are described below.

Embodiment 1

A method of fabricating polycrystalline diamond, comprising encapsulating micron-sized diamond grains and diamond nanoparticles in a canister, and subjecting the encapsulated diamond particles and diamond nanoparticles in the presence of a carburized binder to a pressure of at least 5.0 GPa and a temperature of at least 1000° C. to form intergranular bonds between the diamond particles.

Embodiment 2

The method of Embodiment 1, wherein encapsulating micron-sized diamond grains and diamond nanoparticles in a canister comprises mixing the carburized binder with the micron-sized diamond grains and the diamond nanoparticles.

Embodiment 3

The method of Embodiment 1 or Embodiment 2, further comprising at least partially filling a volume between the micron-sized diamond grains with the carburized binder.

Embodiment 4

The method of Embodiment 3, wherein at least partially filling a volume between the micron-sized diamond grains with the carburized binder comprises saturating a binder with carbon.

Embodiment 5

The method of Embodiment 3, wherein at least partially filling a volume between the micron-sized diamond grains with the carburized binder comprises over-saturating a binder with carbon.

Embodiment 6

The method of any of Embodiments 3 through 5, wherein at least partially filling a volume between the micron-sized diamond grains with the carburized binder comprises diffusing carbon from a diamond-enhanced carbide substrate into the volume between the micron-sized diamond grains.

Embodiment 7

The method of any of Embodiments 1 through 6, further comprising leaching at least a portion of the carburized binder from the polycrystalline diamond.

Embodiment 8

A polycrystalline compact, comprising a plurality of grains of diamond material and a plurality of diamond nanoparticles disposed in interstitial spaces between, and bonded to, the plurality of grains of diamond material. The plurality of diamond nanoparticles are bonded to the grains of diamond material by subjecting the diamond nanoparticles and the grains of diamond material in the presence of a carburized binder to a pressure of at least 5.0 GPa and a temperature of at least 1000° C.

Embodiment 9

The polycrystalline compact of Embodiment 8, wherein the polycrystalline compact is formed by encapsulating the plurality of grains of diamond material and the plurality of diamond nanoparticles in a canister.

Embodiment 10

The polycrystalline compact of Embodiment 8 or Embodiment 9, wherein the polycrystalline compact is formed by mixing the carburized binder with the plurality of grains of diamond material and the plurality of diamond nanoparticles.

Embodiment 11

The polycrystalline compact of any of Embodiments 8 through 10, wherein the polycrystalline compact is formed by at least partially filling a volume between the plurality of grains of diamond material with the carburized binder.

Embodiment 12

The polycrystalline compact of Embodiment 11, wherein the carburized binder is formed by saturating a binder with carbon.

Embodiment 13

The polycrystalline compact of Embodiment 11, wherein the carburized binder is formed by over-saturating a binder with carbon.

Embodiment 14

The polycrystalline compact of any of Embodiments 11 through 13, wherein the carburized binder is formed by diffusing carbon from a diamond-enhanced carbide substrate into the volume between the plurality of grains of diamond material.

Embodiment 15

The polycrystalline compact of any of Embodiments 8 through 14, wherein the polycrystalline compact is formed by leaching at least a portion of the carburized binder from the polycrystalline compact.

Embodiment 16

An earth-boring tool comprising a bit body and a polycrystalline diamond compact secured to the bit body. The polycrystalline compact comprises a plurality of grains of diamond material and a plurality of diamond nanoparticles disposed in interstitial spaces between and bonded to, the grains of diamond material. The plurality of diamond nanoparticles are bonded to the grains of diamond material by subjecting the diamond nanoparticles and the grains of diamond material in the presence of a carburized binder to a pressure of at least 5.0 GPa and a temperature of at least 1000° C.

Embodiment 17

The earth-boring tool of Embodiment 16, wherein the polycrystalline compact is formed by encapsulating the plurality of grains of diamond material and the plurality of diamond nanoparticles in a canister.

Embodiment 18

The earth-boring tool of Embodiment 16 or Embodiment 17, wherein the polycrystalline compact is formed by mixing the carburized binder with the plurality of grains of diamond material and the plurality of diamond nanoparticles.

Embodiment 19

The earth-boring tool of any of Embodiments 16 through 18, wherein the polycrystalline compact is formed by at least partially filling a volume between the plurality of grains of diamond material with the carburized binder.

Embodiment 20

The earth-boring tool of Embodiment 19, wherein the carburized binder is formed by diffusing carbon from a diamond-enhanced carbide substrate into the volume between the plurality of grains of diamond material.

Embodiment 21

The earth-boring tool of any of Embodiments 16 through 20, wherein the polycrystalline compact comprises a leached polycrystalline compact.

While the present disclosure has been described herein with respect to certain embodiments, those of ordinary skill in the art will recognize and appreciate that it is not so limited. Rather, many additions, deletions, and modifications to the embodiments described herein may be made without departing from the scope of the invention as hereinafter claimed, including legal equivalents. In addition, features from one embodiment may be combined with features of another embodiment while still being encompassed within the scope of the invention as contemplated by the inventor. Further, embodiments of the disclosure have utility with different and various bit profiles, as well as various cutting element types and configurations.

What is claimed is:

1. A method of fabricating polycrystalline diamond, comprising:
    saturating a Group VIII-A metal or metal alloy with carbon and forming a carburized binder, the carburized binder including the Group VIII-A metal or metal alloy having a concentration of carbon beyond a carbon-saturation limit for the Group VIII-A metal or metal alloy at room temperature and pressure conditions;
    mixing micron-sized diamond grains and diamond nanoparticles with the carburized binder to form a mixture;
    encapsulating the mixture of micron-sized diamond grains, diamond nanoparticles, and carburized binder in a canister; and
    after saturating the Group VIII-A metal or metal alloy with carbon and forming the carburized binder and mixing the micron-sized diamond grains, diamond nanoparticles, and carburized binder, subjecting the encapsulated mixture of micron-sized diamond grains, diamond nanoparticles, and carburized binder to a pressure of at least 5.0 GPa and a temperature of at least 1000° C. to form polycrystalline diamond having inter-granular bonds between the micron-sized diamond grains and the diamond nanoparticles and carburized binder between the micron-sized diamond grains and the diamond nanoparticles.

2. The method of claim 1, wherein mixing the micron-sized diamond grains and the diamond nanoparticles with the carburized binder comprises at least partially filling a volume between the micron-sized diamond grains and the diamond nanoparticles with the carburized binder.

3. The method of claim 1, further comprising leaching at least a portion of the carburized binder from the polycrystalline diamond.

4. A method of fabricating a polycrystalline diamond cutting element, comprising:
    saturating a Group VIII-A metal or metal alloy with carbon to form a carburized binder, the carburized binder including the Group VIII-A metal or metal alloy having a concentration of carbon beyond a carbon-saturation limit for the Group VIII-A metal or metal alloy at room temperature and pressure conditions;
    mixing micron-sized diamond grains and diamond nanoparticles with the carburized binder to form a mixture;
    encapsulating a substrate blank adjacent to the mixture of micron-sized diamond grains, diamond nanoparticles, and the carburized binder in a canister;
    after saturating the Group VIII-A metal or metal alloy with carbon and forming the carburized binder and mixing the micron-sized diamond grains, diamond nanoparticles, and carburized binder, subjecting the encapsulated mixture of micron-sized diamond grains, diamond nanoparticles, and the carburized binder in the presence of the substrate blank in the canister to a pressure of at least 5.0 GPa and a temperature of at least 1000° C. and forming polycrystalline diamond having inter-granular bonds between the micron-sized diamond grains and the diamond nanoparticles having carburized binder therebetween on the substrate blank.

5. The method of claim 4, further comprising leaching at least a portion of the carburized binder from the polycrystalline diamond.

6. The method of claim 4, wherein the substrate blank comprises a diamond-enhanced carbide substrate.

7. The method of claim 4, wherein the substrate blank comprises a cobalt-cemented tungsten carbide substrate.

8. The method of claim 1, further comprising encapsulating a substrate blank in the canister.

9. The method of claim 8, wherein the substrate blank comprises a diamond-enhanced carbide substrate.

10. The method of claim 8, wherein the substrate blank comprises a cobalt-cemented tungsten carbide substrate.

11. The method of claim 1, wherein the Group VIII-A metal or metal alloy comprises at least one of iron, cobalt, and nickel.

12. The method of claim 1, wherein subjecting the encapsulated mixture of micron-sized diamond grains, diamond nanoparticles, and carburized binder to a pressure of at least 5.0 GPa and a temperature of at least 1000° C. to form polycrystalline diamond comprises converting excess carbon of the carburized binder to diamond.

* * * * *